United States Patent [19]
DeAngelis

[11] Patent Number: 5,488,589
[45] Date of Patent: Jan. 30, 1996

[54] NEURAL NETWORK BASED THREE DIMENSIONAL OCEAN MODELER

[75] Inventor: Christopher M. DeAngelis, Cranston, R.I.

[73] Assignee: The United States of America as represented by the Secretary of the Navy, Washington, D.C.

[21] Appl. No.: 324,640

[22] Filed: Oct. 18, 1994

[51] Int. Cl.$^6$ .............................. G06T 1/40; G06T 17/00
[52] U.S. Cl. ............................................................ 367/131
[58] Field of Search ................................... 367/131, 124, 367/135, 99, 118; 364/516, 460; 395/21, 22; 342/191, 195, 95

[56] References Cited

U.S. PATENT DOCUMENTS 5,307,289  4/1994  Harris ........................................ 364/516

*Primary Examiner*—Daniel T. Pihulic
*Attorney, Agent, or Firm*—Michael J. McGowan; Prithvi C. Lall; Michael F. Oglo

[57] ABSTRACT

A method is described for providing an estimate of the state of a moving contact in a three dimensional ocean. The method comprises the steps of providing a device for estimating the state of the contact, inputting into the device information about a location of an observer during a sequence of time, information from at least one sensor about the position of the contact relative to the observer during the time sequence, and a knowledge vector, transforming the inputted information into a series of three dimensional geographical grids, and analyzing the geographical grids to produce an estimate of the state of the contact with respect to the location of the observer. The device for providing the estimate of the state of the moving contact is a neurally inspired contact estimation device. The device includes a grid stimulation block for transforming the inputted information into the three dimensional geographical grids, a fusion block where grids corresponding to similar time intervals are combined or fused, a correlation block for providing constraints such as constant speed and heading and for producing a path likelihood vector, and an estimate block for providing the estimate of the state of the moving contact. The device further includes a controller for providing knowledge to the aforementioned blocks.

21 Claims, 4 Drawing Sheets

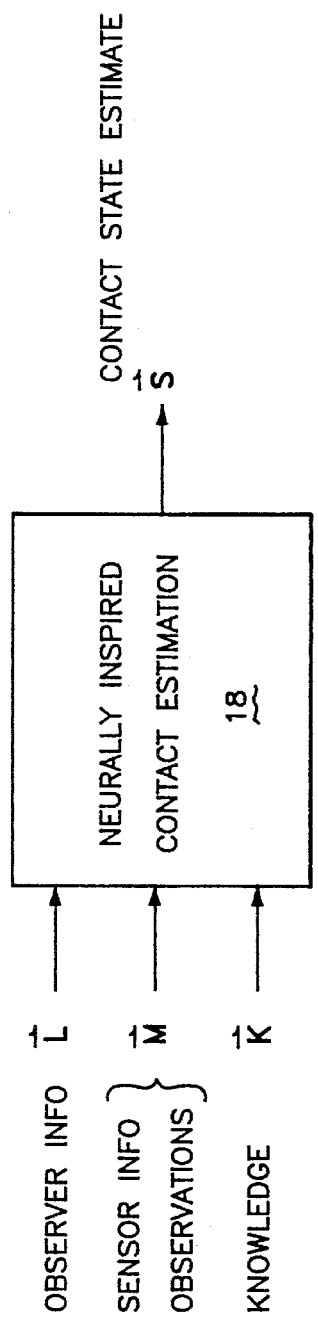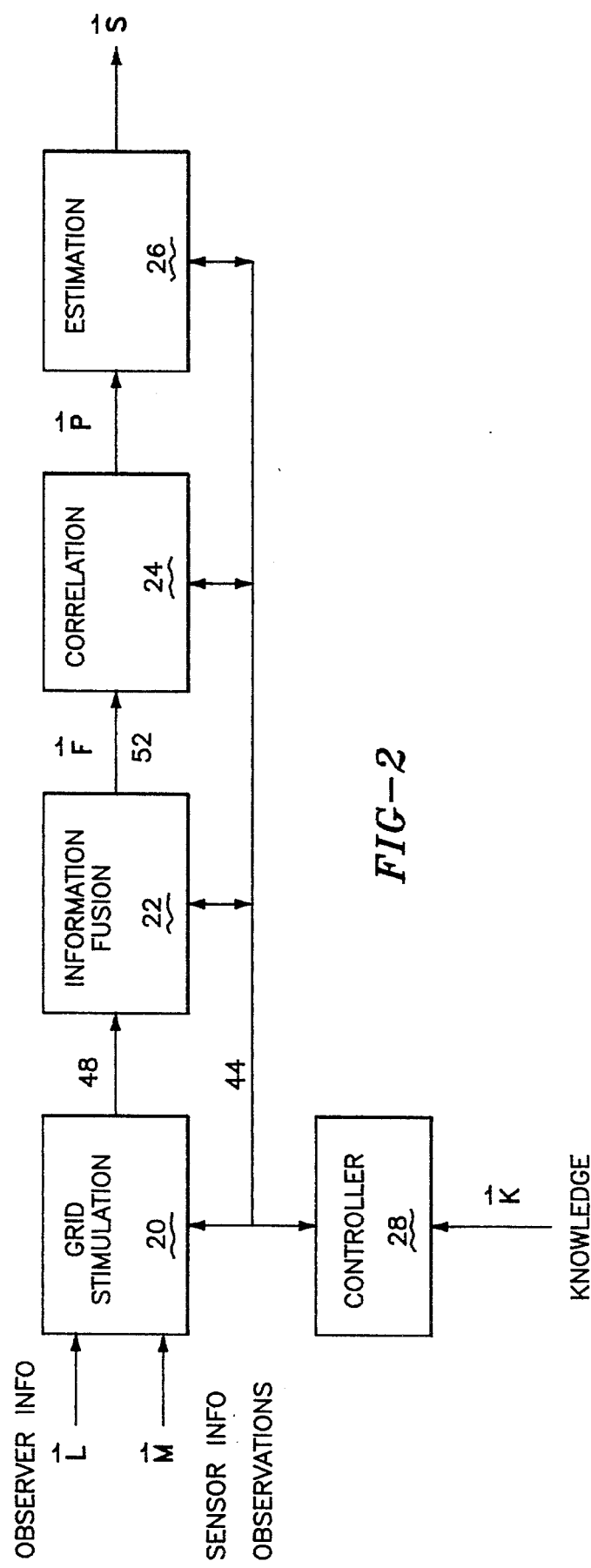

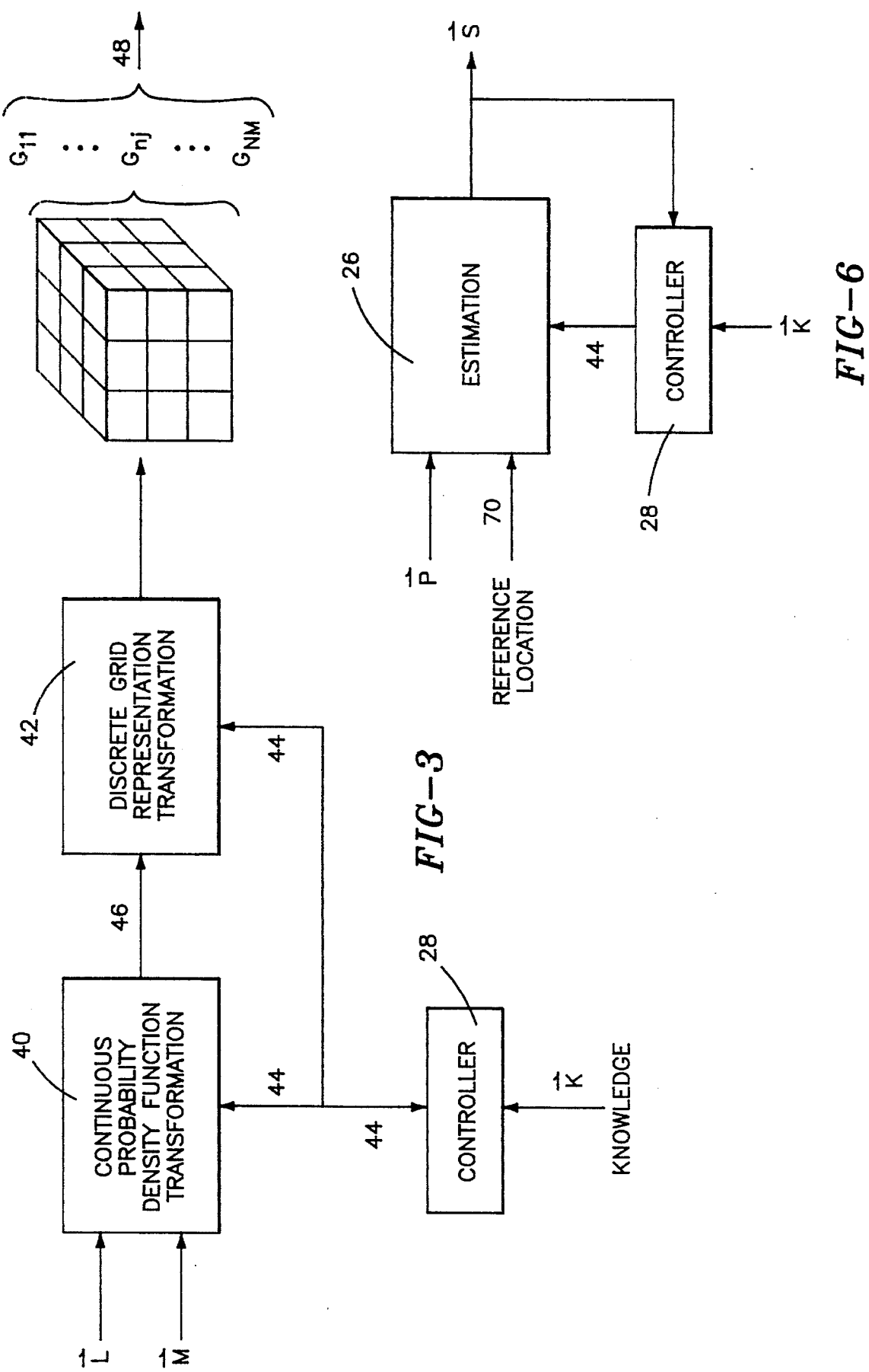

NEURAL NETWORK BASED THREE DIMENSIONAL OCEAN MODELER

STATEMENT OF GOVERNMENT INTEREST

The invention described herein may be manufactured and used by or for the Government of the United States of America for governmental purposes without the payment of any royalties thereon or therefor.

CROSS REFERENCE TO RELATED APPLICATION

The instant application is related to copending patent application Ser. No. 08/324,641, entitled NEURAL NETWORK BASED DATA FUSION SYSTEM of which I am a co-inventor and further identified by Navy Case No. 74703.

BACKGROUND OF THE INVENTION (1) Field of the Invention

The present invention relates to a method for providing an estimate of the position, speed, and direction of travel of a contact or target and a system for performing said method.

(2) Description of the Prior Art

A variety of different devices and methods have been used in the prior art to estimate various physical states using sensor information. U.S. Pat. No. 4,965,732 to Roy III et al., for example, illustrates a method and apparatus for signal reception and parameter estimation which may be used for frequency estimation and filtering, array data processing and the like. The Roy III et al. invention is applicable in the context of array data processing to a number of areas including cellular mobile communications, space antennas, sonobuoys, towed arrays of acoustic sensors, and structural analysis.

The method set forth in the Roy III patent comprises the steps of: (a) providing an array of at least one group of a plurality of signal sensor pairs, the sensors in each pair being identical and the displacement between sensors of each pair in a group being equal, thereby defining two subarrays; (b) obtaining signal measurements with the signal array so configured; (c) processing the signal measurements from the towed subarrays to identify the number of sources and estimate parameters thereof, including identifying eigenvalues from which source number and parameter estimates are based; (d) solving the signal copy problem and determining array response (direction) vector using the generalized eigenvectors; and (e) estimating the array geometry from the array response vectors.

The Roy III apparatus includes an array of at least one group of a plurality of signal sensor pairs for generating signals, the sensors in each pair being identical and the displacement between sensors of each pair in a group being equal, thereby defining two subarrays, and signal processing means for processing the signals from the two subarrays to identify the number of sources and estimate parameters thereof.

Another area where this type of technology has been employed is underwater tracking systems. U.S. Pat. Nos. 5,033,034 to Paradise and 5,036,498 to Van Cappel illustrate two such systems.

The Paradise patent relates to an apparatus located aboard a platform situated in an acoustic environment, such as a submarine, for tracking a moving body, such as a torpedo, when the body is proximate to the platform. The apparatus includes a number of acoustic sensor elements at selected locations around the platform. Each of the sensor elements detects acoustic information arriving at its selected location. The apparatus further includes signal conditioners coupled to the sensor elements with a given one of the signal conditioners providing a conditioned signal representing acoustic information which is emitted by the moving body when the body is proximate to the platform, and which arrives at the location of the acoustic sensor element to which the given signal conditioner is coupled. A processor receives conditioned signals from respective signal conditioners and enables comparisons of selected characteristics of the received signals to the made in order to determine a selected parameter which is related to the movement of the body when the moving body is proximate to the platform.

The Van Cappel patent relates to a method for determining the motion of a target in underwater acoustics by means of an antenna with misaligned sensors provided with a central sensor. The method estimates the characteristics of the velocity and position of the target relative to the antenna by means of a likelihood maximum estimator which takes into account the differences in propagation times measured between the wave fronts transmitted by the target and reaching the sensors. The motion estimator is initialized by means of an initial state vector determined on the basis of the values of the azimuths of the target perceived from the mid-points of each pair of sensors, during a determined number of measurements staggered in time. The action of the state vector takes place in taking account of the value of the elevation of the target with respect to the antenna.

In recent years, computer based technology has advanced to the point where artificial systems have been developed which simulate the operation of the human brain. These systems are known as neural networks. Typically, the systems use numerous nonlinear computational elements operating in parallel and arranged in patterns reminiscent of biological neural networks. Each computational element or neuron is connected via weights or synapses that are adapted during training to improve performance. Many of these systems exhibit self-learning by changing their synaptic weights until the correct output is achieved in response to a particular input. As a consequence, these systems have lent themselves to use in a number of different applications.

One such application is target imaging and identification systems. U.S. Pat. No. 4,995,088 to Farhat illustrates a data analysis system for such an application. Farhat's data analysis system comprises a first array for receiving input data comprising a plurality of neural elements for transmitting data signals and memory means for processing the data signals transmitted by the elements of the first array. The memory means has associatively stored therein in accordance with a Hebbian model of learning for neural networks, at least one quantized feature space classifier of a known data set. The system further comprises a second array having a plurality of neural elements for receiving the data signals processed by the memory matrix. The neural elements of the second array are operatively coupled in feedback with the neural elements of the first array wherein the neural elements of the second array provide feedback input for the neural elements of the first array. In a preferred embodiment of the Farhat system, the neural elements of the first array comprise light emitting elements and the neural elements of the second array photo-detectors.

The general contact state estimation, or target motion analysis, problem is to estimate contact location and motion from all available information. This information may include available sensor readings, environmental data, contact kinematics, and historical data. A three dimensional ocean modeling method in conjunction with a data fusion technique must be employed in order to exploit all available information in ascertaining a contact's state.

In a broad sense, each sensor reading provides constraints on the contact state. If sufficient observations are available, and if assumptions are made about the contact motion (such as constant speed and heading), then the contact state may be constrained to a single solution. Due to uncertainty, or error, associated with physical sensor readings, contact state determination becomes a parameter estimation problem. Noisy sensor readings will preclude an exact solution for contact state; therefore, a method must be employed to determine the most likely state estimate.

The major disadvantages associated with current methods are their significant computational demands, difficulties with solution sensitivity assessment, fusion of multiple sensor information, and incorporation of a-priori information.

SUMMARY OF THE INVENTION

Accordingly, it is an object of the present invention to provide an improved method for providing an estimate of the state of a contact or target.

It is a further object of the present invention to provide a method as above which yields improvements in execution speed, assessment of solution sensitivity, and potential for sensor fusion.

It is another object of the present invention to provide a method as above which incorporates three dimensional ocean modeling.

A still further object of the present invention is to provide a system for performing the above method.

The foregoing objects and advantages are attained by the method and the system of the present invention.

The method of the present invention for providing an estimate of the state of a moving contact broadly comprises the steps of: providing a device for estimating the state of the contact; inputting into the device information about a location of an observer during a sequence of time, information from at least one sensor about a position of said contact relative to the observer during the time sequence, and a knowledge vector; transforming the inputted information into a series of three dimensional geographical grids; and analyzing the geographical grids to produce an estimate of the state of the contact with respect to the location of the observer.

The device for providing the estimate of the state of the moving contact is a neurally inspired contact estimation (NICE) device. The device includes a grid stimulation block where the inputted information is transformed into a series of three dimensional geographical grids, an information fusion block where grids corresponding to similar time intervals are combined or fused, a correlation block for applying constraints such as constant speed and heading and for producing a path likelihood vector, and an estimation block for providing said estimate of the state of the moving contact. The device further includes a controller for providing each of the aforesaid blocks with a-priori information and control parameters. In a preferred embodiment, the device comprises a computer suitably programmed to include the aforesaid functional blocks and to perform the method of the present invention.

Other objects and advantages of the present invention will become more apparent from the following description and drawings wherein like reference numerals depict like elements.

BRIEF DESCRIPTION OF THE DRAWINGS

FIG. 1 is a schematic representation of the system of the present invention;

FIG. 2 is a block diagram of the system of the present invention illustrating a representation of the functional blocks within the device for providing the estimated contact state;

FIG. 3 is a schematic representation of the grid simulation block in the system of FIG. 2;

FIG. 6 is a schematic representation of the estimation block in the system of FIG. 2.

DESCRIPTION OF THE PREFERRED EMBODIMENT

Figure 4:
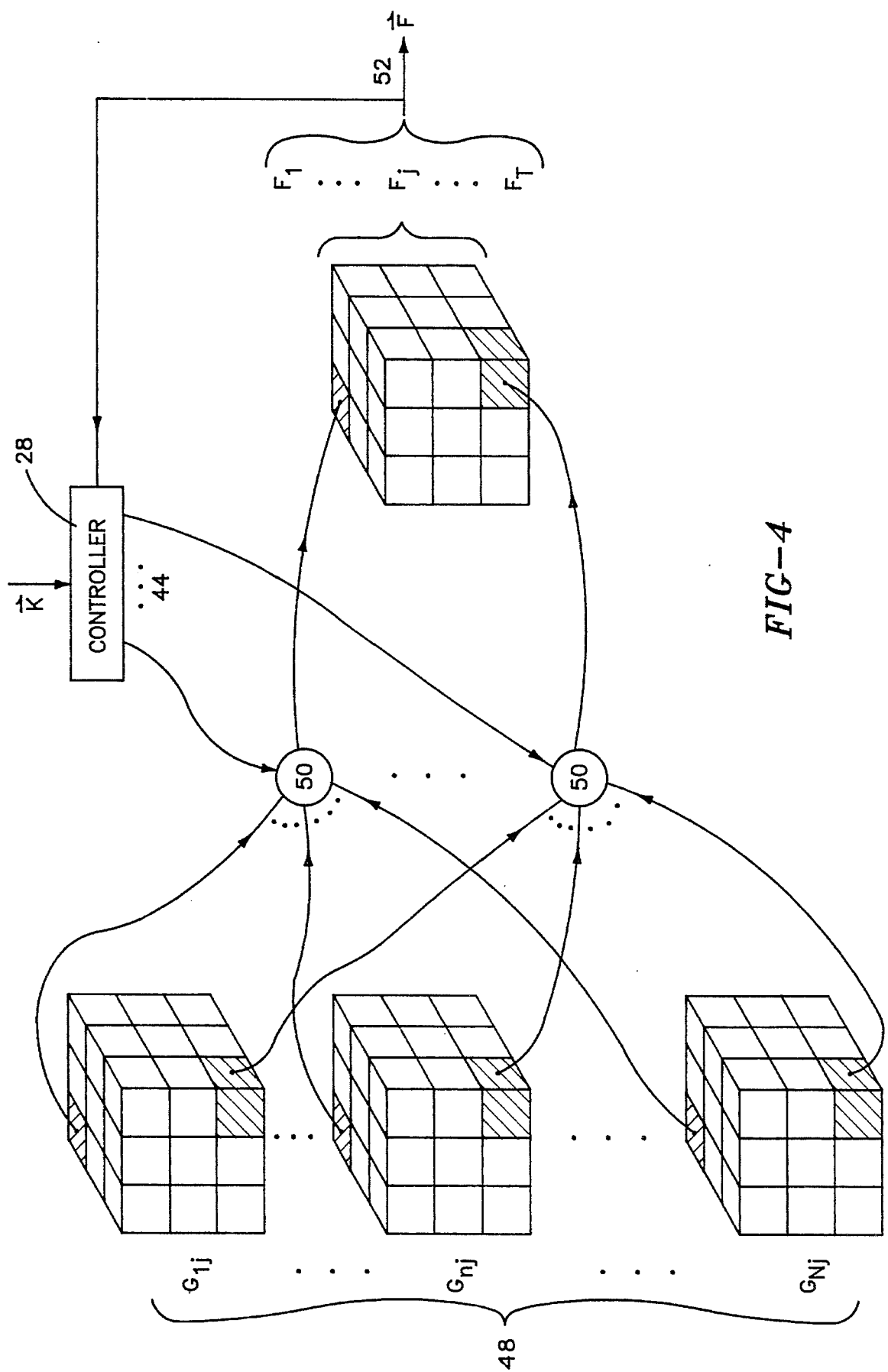
FIG. 4 is a schematic representation of the information fusion block in the system of FIG. 2.

Referring now to the drawings, FIG. 1 broadly illustrates the system 18 of the present invention for providing an estimate of the state of a moving contact, such as an ocean-going body, relative to an observer. The system 18 is formed by a Neurally Inspired Contact Estimation (NICE) device. The current inventor provides a detailed description of the NICE architecture in papers authored by him and R W Green entitled, "An Architected Neural Network For Contact State Estimation" IEEE Proceedings of OCEANS 92, vol. 1, pp. 153–157, and "Constructing Neural Networks For Contact Tracking", Neural Networks For Signal Processing Proceedings of the 1992 IEEE Workshop.

As shown therein, the inputs to the system 18 are an observer information vector $\vec{L}$, a sensor information vector $\vec{M}$, and a knowledge vector $\vec{K}$. The observer information vector $\vec{L}$ contains the locations of the observer during a particular period of time having time intervals 1 to T. The sensor information vector $\vec{M}$ contains sensor data for the corresponding time periods. The sensor data may be generated by one or more sensors (not shown). If desired, the observer and the sensors may be located upon an observation platform such as a ship. The information in the vector $\vec{M}$ may include: location of contact relative to the observer, bearing angle, or the like. The knowledge vector $\vec{K}$, contains a-priori knowledge which may include: environmental data such as a sound velocity profile or sound propagation characteristics; sensor characteristics such as measurement error, confidence in the sensor, and modeling anomalies; contact kinematics such as maximum speed and depth; historical data such as previous state estimates or possible containment regions for a contact; or the like. It is through the knowledge vector $\vec{K}$ that the model created by the system 18 becomes an intelligent and adaptive three dimensional ocean based model. The information vectors $\vec{L}$, $\vec{M}$ and $\vec{K}$ may be inputted into the device 18 using any suitable input means known in the art.

The system 18 produces an output vector $\vec{S}$ which contains an estimate of the contact state with respect to the observer's location. Typically, the contact state consists of one or more of: bearing from observer to contact, range from observer to contact, contact depth, contact course, contact speed, or the like. The output vector $\vec{S}$ may be displayed in any desired form. For example, the output vector may be a visual display on a screen or a written display on a chart or graph paper. The vector could take the form of marked boxes on a graph display which indicate an estimate of the course taken by the contact. As shown in FIG. 2, the system 18 is made up of four major functional blocks and a controller. The four major functional blocks are a grid stimulation block 20, an information fusion block 22, a correlation block 24 and an estimation block 26.

The grid stimulation block 20 transforms the observer and sensor information vectors $\vec{L}$ and $\vec{M}$ into a series of three dimensional geographical grids indicated by arrow 48. Preferably, one geographical grid is formed for each sensor reading. After the geographical grids have been formed and the information about them has been inputted into the block 22, information fusion is performed to combine geographical grids corresponding to similar time intervals into a set of consolidated grid representations $F_1 \ldots F_T$. A single consolidated grid representation $F_j$ is representative of available information for a respective time interval (or time plane). The vector $\vec{F}$ containing all consolidated grid representations indicated by the arrow 52 is then fed into the correlation block 24.

The correlation block 24 applies motion constraints such as constant-speed-and-course constraint for contact motion to the consolidated grid representations. The output of the correlation block is a path likelihood vector $\vec{P}$ containing a likelihood measure for each possible contact path. A possible path is defined as one from a geographical cell center in the first time 18 plane to a cell center in the last time plane.

The estimation block 26 transforms the path likelihood vector $\vec{P}$ to a contact state estimate vector $\vec{S}$.

The controller 28 incorporates a-priori knowledge vector $\vec{P}$ into the four functional blocks described above. Various information is sent to each block through the connections 44. Furthermore, the controller monitors each block through the connections 44. In this way, the controller 28 may adjust parameters or knowledge accordingly to improve the state estimate vector $\vec{S}$.

The grid stimulation block 20 shown in FIG. 3, transforms the information vectors $\vec{L}$ and $\vec{M}$ into a series of three dimensional geographical grids 48 using standard mathematical techniques. The stimulation block forms geographical grids ranging from grid $G_{11}$ to $GN_{NMn}$ where N is the number of sensors and $M_n$ is the number of measurements for a respective sensor n. The number of measurements $M_n$ for a sensor may be equal or less then the number of time intervals T. The designation $G_{nj}$ used in the figure refers to the geographical grid formed by sensor n for time interval j. This transformation is preferably formed in two stages. First, pairs of sensor observation and location information are formed. Each pair is then transformed in the block 40 into a three dimensional continuous probability density function 46 representing the likelihood of the contact's location over the respective time plane. The controller 28 incorporates through connections 44 three dimensional propagation characteristics, three dimensional sensor motion compensations, measurement confidence, and the like into this transformation. This is done to convert the pair information into the three dimensions that make up the actual environment. For example, due to temperature gradients sound does not travel in a straight path, rather it takes a curved path. This is valuable information used in forming an accurate probability density function. Furthermore, high measurement confidence also influences the form of the probability density function in that more weight or attention is given to regions along the measurement propagation path.

After all of the continuous probability density functions 46 have been determined, they are transformed in the block 42 into discrete values corresponding to stimulation levels for the cells in the three dimensional geographical grids $G_{nj}$. A grid's cells are stimulated in proportion to the likelihood of the contact's presence. For example, the probability of the contact being in a cell may be 0.55. In a simple system, the cell may be stimulated so that it has a value of "1" which indicates that there was a contact in that cell at that point in time. Alternatively, the probability of a contact being in a cell may be 0.40. In this case, in a simple system, the cell is stimulated so as to have a value of "0" which means that there was no contact in the cell at that point in time. The controller 28, in this instance, advises on a coordinate system to be used and a corresponding grid's resolution. The controller also analyzes the grids and makes any required adjustments to the controlling parameters. For example, the controller may adjust the number of rows or columns in the grids, or the number of layers in the neural net. Information about the three dimensional geographical grids 48 is then inputted into the information fusion block 22.

The information fusion block 22 is illustrated in FIG. 4. In this block, the geographical grids 48 corresponding to equivalent time intervals are combined to form one or more fused geographical grids $F_j$ representative of information in the interval. The block 22 has a series of artificial neurons 50 that combine like regions from each sensor's grid based upon confidence on each sensor and taking into account contact motion and kinematic constraints such as maximum speed or maximum drive rate. Sensor confidence knowledge may be inputted through the controller 28 which may, for example, instantaneously tell one or more of the neurons 50 to ignore information from certain sensors. Additionally, the neurons 50 may ignore information which is in contradiction to the given contact restraints.

The number of artificial neurons 50 in the block 22 depends upon the size of the geographical grids that are formed in the stimulation block and may be equal in number to the number of cells in the grids 48. Alternatively, the number of artificial neurons 50 may be dictated by the size of the fused grid representations to be formed.

The controller 28 through connections 44 is also used to excite or inhibit cell fusion according to a-priori knowledge in the formation of the fused grid. For example, the controller may be provided with certain knowledge about a sensor from an external source and may instruct the neurons 50 to ignore information from a sensor and/or weight other information accordingly. Still further, the controller 28 may shut off certain neurons based on external knowledge. As can be seen from this description, the controller 28 plays a dynamic role and provides an automatic control system for this functional block as well as the others.

Each fused geographical grid $F_1$ to $F_T$ formed by the information fusion block can be represented as a linear vector. The compilation of these vectors, $\vec{F}$, is the output 52 of the block 22.

Figure 5:
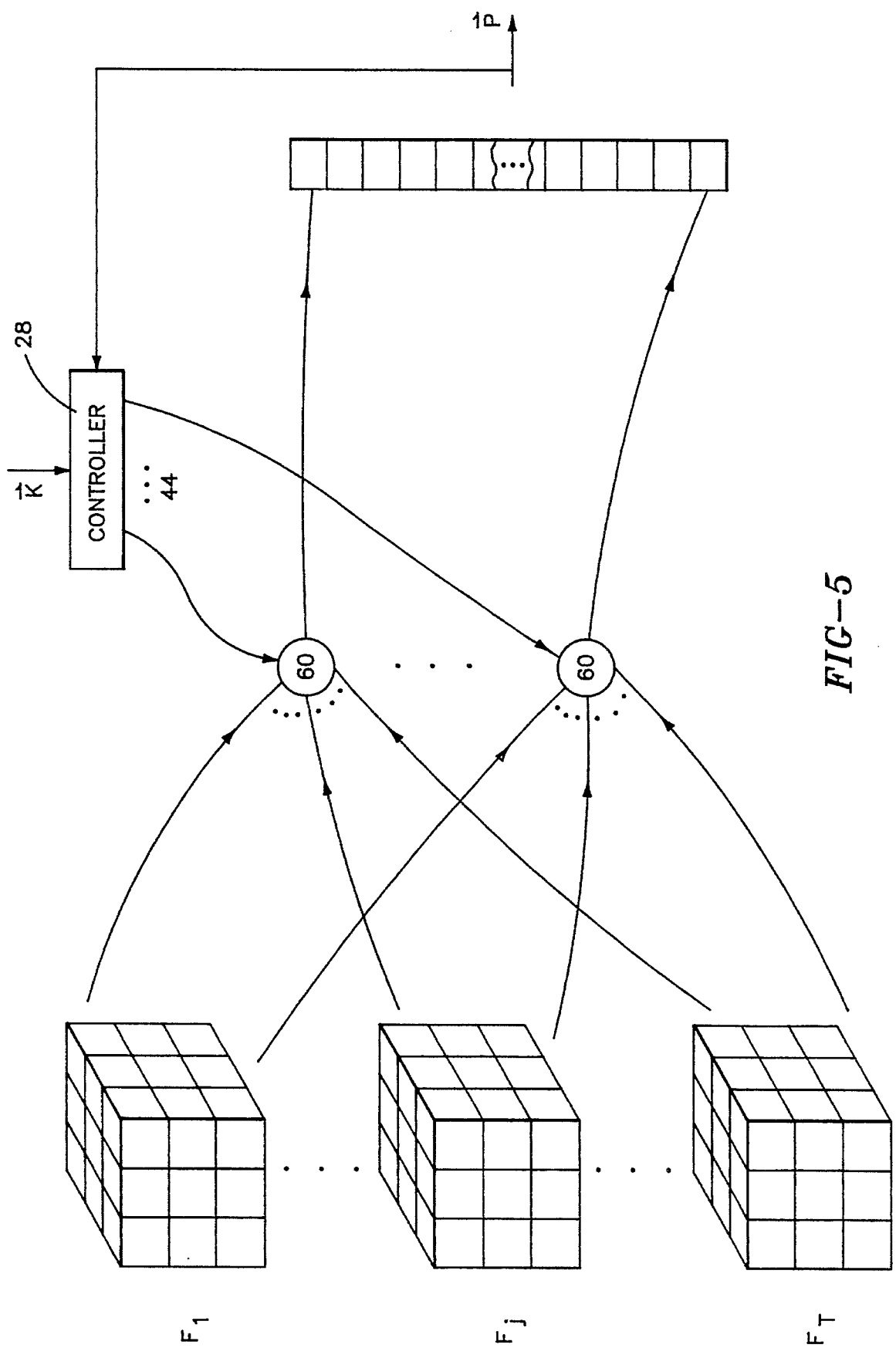
FIG. 5 is a schematic representation of the correlation block in the system of FIG. 2.

The correlation block 24 is illustrated in FIG. 5. As shown therein, the block 24 has a series of artificial neurons 60 that compute a measure of the likelihood that a particular path was taken by the contact. The maximum number Q of neurons 60 in the block may be equal to the number of rows in the grid $F_j$ multiplied by the number of columns in the grid $F_j$ multiplied by the number of layers in the grids $F_j$, squared, assuming all the grids $F_j$ have the same size. If the grids, $F_j$ are not all the same size, then the number of neurons 60 may be arbitrary. The neurons 60 should identify all the potential paths for the contact. For example, one neuron may represent a due north heading with the contact travelling at a speed S1, a second neuron may represent a due north heading with the contact travelling at a speed S2, and a third neuron may represent a due east heading with the contact travelling at the speed S1. The set of paths $P_i$ defined by the neurons comprises all possible paths between geographical cell centers starting in a grid corresponding to the first observation interval and ending in a grid corresponding to the last observation interval. In the three dimensional environment modelled by the present invention, fewer neurons may be present than in a two dimensional model. This is because certain paths and depths may be impractical given the knowledge that the water is not as deep as the path suggests.

Each neuron 60 corresponds to a particular path and has one input from each fused grid vector $F_1$ through $F_T$. Each input is from the vector entry which corresponds to the geographical cell containing the location of the contact at the time of the observation, assuming the contact were on the given path. Thus each neuron acts as an evidential combiner; its inputs represent compliance between a hypothesized contact path and the sensor observations at specific times, and its output represents the overall path likelihood.

The controller 28 through connections 44 excites or inhibits the correlation neurons according to a-priori knowledge and this influences the formation of the path likelihood vector $\vec{P}$ (the vector of neuron outputs). This knowledge may include maximum speed and depth, depth change characteristics, or the like. For example, the controller 28 may turn off certain neurons 60 based on the knowledge that a particular path was not possible.

The estimation block 26 is illustrated in FIG. 6. Its inputs are the path likelihood vector $\vec{P}$ produced by the correlation block and a reference location 70. The function of this block is to transform the path likelihoods into a contact state estimate vector $\vec{S}$ with respect to the reference location 70 using an averaging method. The controller 28 through connection 44 advises this block on an averaging method to be employed in the block and provides constraints to be placed on the estimate. These constraints may include: maximum speed, maximum depth, or the like. The controller 28 also monitors the estimates and makes appropriate parameter changes throughout the system. For example, if the variance of an estimate is too high, the controller may tell the estimation block to ignore certain path likelihoods. Also, the controller 28 may update the sizes of the geographical grids and the fused grid representations depending upon what it is seeing. Still further, the controller may instruct the estimation block 26 to change the averaging method being used.

As can be seen from the foregoing discussion, the controller 28 takes certain a-priori knowledge and provides guidance to each of the functional blocks making up the system 18. It also monitors each block and updates system parameters accordingly. This allows for a feedback mechanism to fine tune the state estimate $\vec{S}$ and fully exploit all available information.

The system 18 described herein may be implemented in hardware using standard electronic components to form the circuits for performing the functions in the various functional blocks; however, it is preferred to implement the system using a computer and software which carries out the aforementioned functions. The software may be in any desired language and may use standard mathematical techniques to perform the functions described herein. A software implementation is preferred due to the number of cells and connections required and the limitations of current VLSI circuit densities.

In operation, an estimate of the state of a moving contact is provided by inputting into a device such as a programmed computer information about a location of an observer during a sequence of time, information from at least one sensor about a position of the contact relative to an observer during the sequence of time, and a-priori knowledge information. The inputted information is then transformed into a series of geographical grids with each grid having a plurality of cells. The geographical grids so produced are then analyzed to produce an estimate of the state of the contact with respect to a location of an observer. The analysis comprises combining grids corresponding to similar time intervals into a series of consolidated grid representations. Thereafter, constant speed and course constraints for contact motion are applied to the consolidated grid representations and a path likelihood vector is produced. Finally, the path likelihood vector is transformed into the estimate of the contact state. The functional blocks for performing the steps described herein are discussed above.

The major advantages of the system and the method of the present invention over those known in the prior art include: the ability to perform three dimensional ocean modeling, sensor fusion, and an assessment of solution sensitivity. In addition, a mechanism is provided to incorporate knowledge such as environmental data, contact kinematics and historical data. Furthermore, the inclusion of a feedback path allows for the fine tuning of the state estimate. Overall, a three dimensional ocean modeling method in conjunction with a data fusion technique, and a controller are employed in order to exploit all available information in ascertaining a contact's state.

While a rectangular coordinate system has been described in forming the geographical grids, it is possible to perform the present invention using a polar coordinate system where each cell represents a (range, angle, depth) triplet where range is the distance from observer to contact, angle is a bearing in the horizontal plane, and depth is a bearing in a vertical plane.

It is apparent that there has been provided in accordance with this invention a neural network based three dimensional ocean modeler which fully satisfies the objects, means and advantages set forth hereinbefore. While the invention has been described in combination with specific embodiments thereof, it is evident that many alternatives, modifications and variations will be apparent to those skilled in the art in light of the foregoing description. Accordingly, it is intended to embrace all such alternatives, modifications, and variations as fall within the spirit and broad scope of the appended claims.

What is claimed is:

1. A method for providing an estimate of the state of a moving contact comprising the steps of:

providing a device for estimating the state of said contact;

inputting into said device information about a location of an observer during a sequence of time, information from at least one sensor about a position of said moving contact relative to said observer during said sequence of time, and a-priori knowledge;

transforming the inputted information into a series of three dimensional geographical grids with each grid having a plurality of cells; and analyzing said geographical grids to produce an estimate of the state of the contact with respect to the location of the observer.

2. The method of claim 1 wherein said inputting step comprises inputting knowledge including at least one of environmental data, sensor characteristics, contact kinematics and historical data.

3. The method of claim 1 wherein said inputting step comprises:

inputting sensor data which includes at least one of location relative to the observer and contact measurements; and inputting knowledge data which includes at least one of measurement error and confidence in the sensor.

4. The method of claim 1 further comprising:

stimulating said cells in said geographical grids in proportion to the likelihood of a contact's presence; and said analyzing step comprises fusing said geographical grids with said stimulated cells so that grids corresponding to similar time intervals are combined into a series of consolidated grid representations.

5. The method of claim 4 wherein said analyzing step further comprises:

applying a constant speed and course constraint for contact motion to said consolidated grid representations; and producing a path likelihood vector containing a likelihood measure for each possible contact path.

6. The method of claim 5 wherein said analyzing step further comprises transforming said path likelihood vector into said estimate of the contact state.

7. The method of claim 6 further comprising:

providing a controller having access to said a-priori knowledge; and transferring said knowledge from said controller to various functional blocks for performing said information transformation step, said stimulating step, said fusing step, said constant speed and course constraint applying step, said path likelihood vector producing step, and said path likelihood vector transformation step.

8. The method of claim 7 further comprising:

monitoring said various functional blocks with said controller; and adjusting parameters within at least one of said blocks using said controller to improve the contact state estimate.

9. The method of claim 1 wherein said transforming step comprises:

forming observation and location pairs for each sensor;

transforming said pairs into three dimensional continuous probability density functions representing the likelihood of the contact's location over the respective time plane;

incorporating at least one of three dimensional sound propagation characteristics, three dimensional sensor motion compensations, and measurement confidence into said probability density functions;

transforming said three dimensional continuous probability density functions into discrete values corresponding to stimulation levels for the cells in said geographical grids;

choosing at least one of a coordinate system and a cell resolution using a controller having access to said a-priori knowledge; and using said controller to analyze the grids and make adjustments to a set of controlling parameters.

10. A system for providing an estimate of the state of a moving contact which comprises:

a device for estimating the state of said contact;

means for inputting into said device information about a location of an observer during a sequence of time, information from at least One sensor about a position of said contact relative to said observer, and a-priori knowledge;

said device having means for transforming said knowledge and said observer and said location information into an estimate of the state of said contact with respect to the location of said observer;

said device having controller means for providing said knowledge to said transforming means; and said transforming means having a stimulation block for transforming said observer and sensor information into a series of three dimensional geographic grids with each grid having a plurality of cells.

11. The system of claim 10 wherein said stimulation block comprises:

first means for transforming pairs of said sensor observation information and said location information into three dimensional continuous probability density functions representing the likelihood of the contact's location over the respective time plane; and second means for transforming said probability density functions into discrete values corresponding to stimulation levels for the cells in said three dimensional geographical grids.

12. The system of claim 11 wherein said controller means further comprises:

means for providing knowledge about at least one of three dimensional sound propagation characteristics, three dimensional sensor motion compensations, and measurement confidence to said first means;

means for advising said second means about at least one of a coordinate system and a cell resolution; and means for analyzing said grids and making adjustments to parameters controlling said grids.

13. The system of claim 10 wherein said transforming means further comprises an information fusion block for combining ones of said grids corresponding to similar time intervals into a series of consolidated grid representations.

14. The system of claim 13 wherein said information fusion block has a series of artificial neurons for combining like-regions from each geographical grid.

15. The system of claim 14 further comprising said controller affecting cell fusion according to a-priori knowledge and the formation of the consolidated grid representations.

16. The system of claim 13 wherein said transforming means further comprises a correlation block for applying motion constraints to said consolidated grid representations and producing a path likelihood vector containing a likelihood measure for each possible contact path.

17. The system of claim 16 wherein said correlation block has a series of artificial neurons for computing a measure of the likelihood that a particular path was taken by the contact, each said neuron receiving an input from each of said consolidated grid representations.

18. The system of claim 17 further comprising said controller means affecting said neurons according to a-priori knowledge including at least one of maximum speed and depth and depth change characteristics.

19. The system of claim 16 wherein said transforming means further comprises an estimation block for transforming the path likelihood vector to said estimate of said contact state.

20. The system of claim 19 wherein said controller means further comprises:

means for advising said estimation block on an averaging method; and means for providing constraints to be placed on said estimate.

21. The system of claim 16 wherein said controller means further comprises:

means for monitoring each said block; and means for adjusting at least one of parameters and knowledge to improve the estimate of said contact state.

* * * * *